United States Patent
Patterson (10) Patent No.: US 11,263,274 B2
(45) Date of Patent: Mar. 1, 2022

(54) LINKING AND MONITORING OF OFFENDER SOCIAL MEDIA

(71) Applicant: **Global Tel*Link Corporation**, Reston, VA (US)

(72) Inventor: Michael Kenneth Patterson, Roseville, CA (US)

(73) Assignee: **GLOBAL TEL*LINK CORPORATION**, Reston, VA (US)

( * ) Notice: Subject to any disclaimer, the term of this patent is extended or adjusted under 35 U.S.C. 154(b) by 250 days.

(21) Appl. No.: 15/723,489

(22) Filed: Oct. 3, 2017

(65) Prior Publication Data

US 2019/0102459 A1 Apr. 4, 2019

(51) Int. Cl.
*G06F 16/951* (2019.01)
*G06F 16/906* (2019.01)
*G06F 40/295* (2020.01)
*G06Q 50/00* (2012.01)
*G06Q 50/26* (2012.01)

(52) U.S. Cl.
CPC .......... *G06F 16/951* (2019.01); *G06F 16/906* (2019.01); *G06F 40/295* (2020.01); *G06Q 50/01* (2013.01); *G06Q 50/265* (2013.01)

(58) Field of Classification Search
CPC ............. G06F 17/30864; G06F 17/278; G06F 16/951; G06F 16/906; G06F 40/295; G06Q 50/01; G06Q 50/265
USPC ........................................................ 707/709
See application file for complete search history.

(56) References Cited

U.S. PATENT DOCUMENTS

| | | | | |
|---|---|---|---|---|
| 2006/0018520 A1* | 1/2006 | Holloran | ................ | G06Q 10/10 382/116 |
| 2013/0191898 A1* | 7/2013 | Kraft | ....................... | G06F 21/31 726/6 |
| 2013/0232159 A1* | 9/2013 | Daya | ..................... | G06Q 50/01 707/758 |
| 2014/0081636 A1* | 3/2014 | Erhart | ................... | G06Q 50/01 704/236 |
| 2014/0280559 A1* | 9/2014 | Torgersrud | .............. | H04L 67/22 709/204 |
| 2014/0294257 A1* | 10/2014 | Tussy | ................ | G06F 17/30247 382/118 |

(Continued)

*Primary Examiner* — Tony Mahmoudi
*Assistant Examiner* — Kamal K Dewan
(74) *Attorney, Agent, or Firm* — Sterne, Kessler, Goldstein & Fox P.L.L.C.

(57) ABSTRACT

Disclosed herein are system, method, and computer program product embodiments for identifying and monitoring social media accounts belonging to offenders, inmates, and relevant third parties. In an embodiment, a social media monitoring system retrieves information from a criminal history database to identify and verify social media account information. In an embodiment, a social media monitoring system retrieves information from an offender communication device, such as a computer, phone, or tablet, to identify and verify social media account information. The social media monitoring system analyzes this information, retrieves social media accounts, and generates a confidence score and/or relevance score for each retrieved social media account. Social media monitoring system organizes links to the social media accounts based on the scores and also generates alerts when a security threat associated with the social media accounts is detected.

22 Claims, 5 Drawing Sheets

(56) References Cited

U.S. PATENT DOCUMENTS

| | | | | |
|---|---|---|---|---|
| 2014/0297739 A1* | 10/2014 | Stein | ............ | H04L 67/22 |
| | | | | 709/204 |
| 2014/0303993 A1* | 10/2014 | Florian | ............ | G06F 19/328 |
| | | | | 705/2 |
| 2015/0096002 A1* | 4/2015 | Shuart | ............ | G06F 21/32 |
| | | | | 726/7 |
| 2015/0234830 A1* | 8/2015 | Bergman | ............ | G06F 17/3053 |
| | | | | 707/749 |
| 2017/0032384 A1* | 2/2017 | Harris | ............ | G06Q 30/0201 |
| 2017/0039652 A1* | 2/2017 | Sandre | ............ | H04L 63/102 |
| 2017/0111385 A1* | 4/2017 | Madhu | ............ | G06Q 50/265 |
| 2017/0270628 A1* | 9/2017 | Roof | ............ | G06F 17/30477 |
| 2017/0316519 A1* | 11/2017 | Wang | ............ | G06Q 50/01 |
| 2017/0358032 A1* | 12/2017 | Huffner | ............ | G06Q 50/01 |
| 2018/0091611 A1* | 3/2018 | Liu | ............ | H04L 67/22 |
| 2019/0068632 A1* | 2/2019 | Foster | ............ | H04L 63/20 |

* cited by examiner

LINKING AND MONITORING OF OFFENDER SOCIAL MEDIA

BACKGROUND

Field

The disclosure relates to a system and method for identifying and monitoring offender and inmate social media accounts as well as related third-party social media accounts.

Background

When making an arrest, law enforcement officers require relevant criminal information in order to effectively determine whether a suspect has demonstrated a sufficient amount of probable cause to constitute an arrest. Similarly, the judiciary also requires information relevant to a suspect in order to make a determination of guilt. One such source of this information is social media accounts belonging to suspects and suspect affiliates. Scouring the Internet for this information, however, is cumbersome without a more intelligent method of processing the information. Further, monitoring updates related to the accounts may require resources that law enforcement agencies are unable to provide.

Similarly, in a controlled environment, such as a correctional facility, inmates have limited opportunities to access the Internet and are typically restricted from accessing social media accounts. During this period of incarceration, however, information and communications posted to social media accounts may reveal unauthorized access, security threats, and/or criminals plots. Accessing and monitoring information on relevant social media accounts would allow for the prevention and reduction of public safety threats.

BRIEF DESCRIPTION OF THE DRAWINGS

The accompanying drawings are incorporated herein and form a part of the specification.

The present disclosure will be described with reference to the accompanying drawings. In the drawings, like reference numbers generally indicate identical or similar elements. Additionally, generally, the left-most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, or hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Provided herein are system, apparatus, device, method and/or computer program product embodiments for identifying and monitoring offender and inmate social media accounts as well as related third-party social media accounts.

In an embodiment, the systems and methods described herein identify relevant social media accounts using public Internet data, law enforcement criminal history data, and correctional facility data. For example, a social media monitoring system generates a list of potential social media accounts related to an offender or inmate. An offender may be an individual accused of committing a crime, an individual who has been arrested, and/or an individual who has been charged and is awaiting trial or the conclusion of a trial. An inmate is an individual serving time in jail, prison, and/or house arrest and may be a convicted criminal. The social media monitoring system also calculates a confidence score that indicates the confidence that a particular social media account belongs to an offender or inmate. Using this confidence score, the social media monitoring system organizes the list of potential social media accounts. The social media monitoring system provides an automated system capable of identifying social media accounts even under aliases, aiding law enforcement agents and the judiciary with gathering information relevant to an offender or inmate while minimizing resource expenditures.

The social media monitoring system is also capable of identifying social media accounts that do not belong to the offender or inmate but belong to related individuals. For example, the social media monitoring system identifies others who participated in the offender's crime, belong to the same criminal organization, and/or have the propensity to commit a crime in the future. Using techniques similar to identifying social media accounts belonging to the offender or inmate, the social media monitoring system is able to generate a confidence score indicative of whether a social media account belongs to the individual as well as a relevance score indicative of the degree of interaction with the offender or inmate. Based on this third party identification, the social media monitoring system also creates an interconnected "web" or "net" of individuals connected by association. This charting allows the social media monitoring system to maintain connections among many offenders, inmates, and third-parties to track patterns or identify communications related to the offenders or inmates. The social media monitoring system also generates graphical user interfaces displaying social media accounts identified as relevant based on a threshold and a confidence score.

Along with identifying social media accounts related to offenders, inmates, and third parties, the social media monitoring system also monitors identified accounts to identify new information. The social media monitoring system will generate an alert based on certain parameters in response to detecting a security threat when identifying this new information. For example, if an inmate creates a social media post on the inmate's social media profile, the social media monitoring system will recognize the post and generate an alert indicating that the inmate may be accessing a contraband communication device, such as a phone or tablet. Similarly, the social media monitoring system will generate notifications based on recognized crime-related keywords, such as crimes, drugs, or firearms. By automating the monitoring process, law enforcement and correctional facility agents will be able to identify potential security threats and reduce the occurrence of possible crimes without needing to dedicate personnel to constantly monitor offender, inmate, and third party social media accounts.

Figure 1:
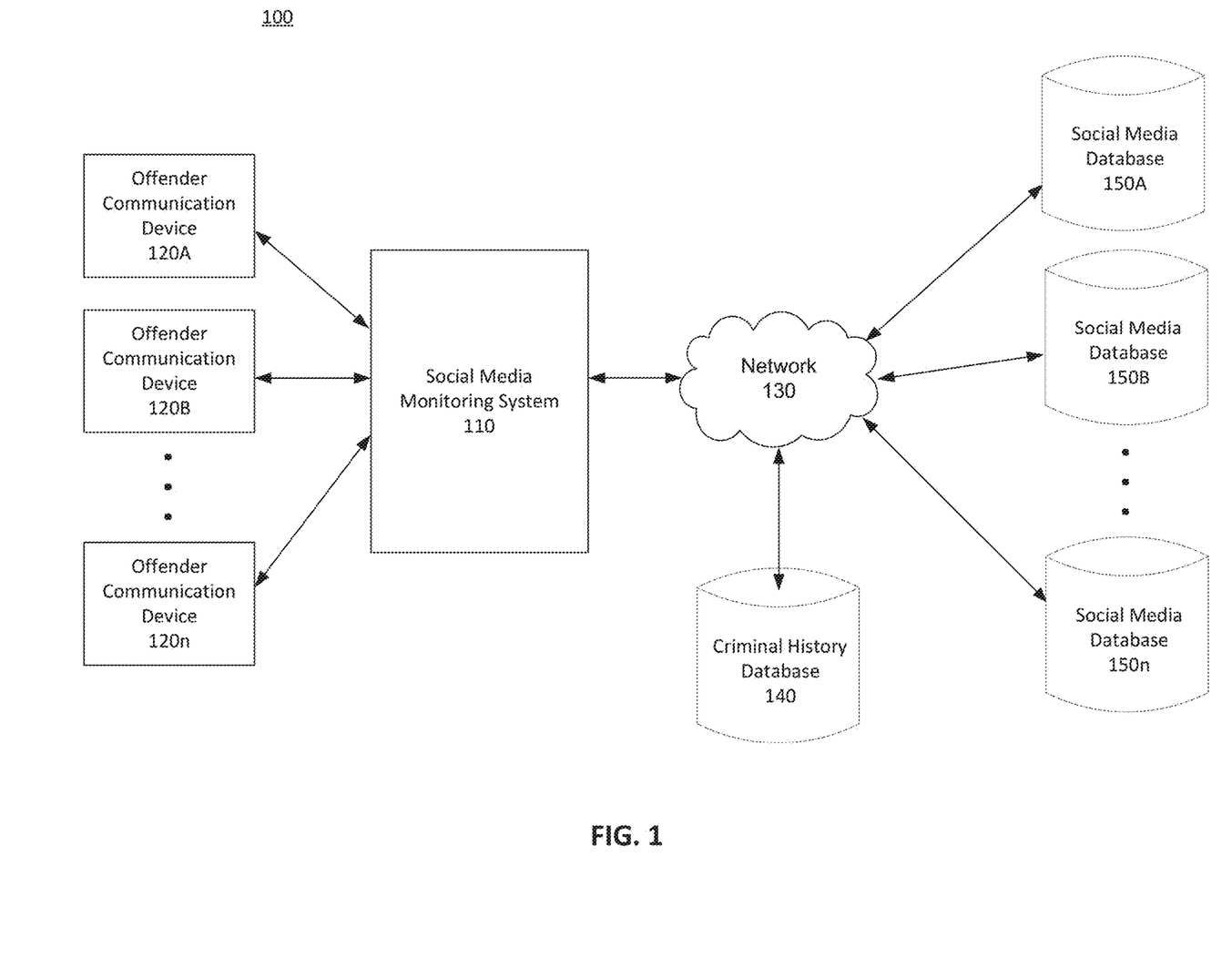
FIG. 1 illustrates a block diagram of a social media monitoring environment, according to exemplary embodiments.

FIG. 1 illustrates a block diagram of a social media monitoring environment 100, according to exemplary embodiments. In an embodiment, social media monitoring environment 100 includes a social media monitoring system 110, offender communication devices 120A, 120B, . . . , 120n, network 130, criminal history database 140, and social media databases 150A, 150B, . . . , 150n.

Social media monitoring system 110 includes one or more processors, memory, servers, routers, modems, and/or antennae configured to interface with offender communication devices 120, network 130, criminal history database 140, and/or social media database 150. Social media monitoring system 110 is a system accessible by law enforcement officers and/or prosecutors to identify social media accounts belonging to offenders, inmates, and/or third party individuals associated with the offenders and inmates. Social media monitoring system 110 identifies social media accounts including personal web pages, personal profiles, professional resume/portfolio accounts, image uploading accounts, video uploading accounts, audio uploading accounts, video game profiles, message board postings, electronic forum postings, web pages that allow for user commentary, and/or other public accounts that associate a user with an online posting. Social media monitoring system 110 identifies posts as well as web pages belonging to the offender, inmate, and/or relevant third parties. A method of operation of social media monitoring system 110 will be described in more detail with reference to FIG. 2.

Social media monitoring system 110 retrieves information from criminal history database 140 and offender communication devices 120 to identify relevant social media accounts. In an embodiment, social media monitoring system 110 communicates with criminal history database 140, social media databases 150, and/or offender communication devices 120 via network 130 and/or a network protocol to send and receive data over network 130. Network 130 is a network capable of transmitting information either in a wired or wireless manner and may be, for example, the Internet, a Local Area Network (LAN), or a Wide Area Network (WAN). The network protocol may be, for example, a hypertext transfer protocol (HTTP), a TCP/IP protocol, User Datagram Protocol (UDP), Ethernet, cellular, Bluetooth, or an asynchronous transfer mode, to name just a few examples, or any combination thereof.

To identify social media accounts related to offenders, inmates, and relevant third parties, social media monitoring system 110 accesses information stored in criminal history database 140, offender communication device 120, and/or other public information via the Internet. Using this information, social media monitoring system 110 identifies one or more social media accounts.

In an embodiment, social media monitoring system 110 utilizes identification information related to the offender or inmate to perform an initial search for relevant social media accounts. The identification information includes, for example, the offender's name, associated phone numbers, addresses, electronic contact information (such as email address, social media handle, video game handle, message board handle, or electronic forum handle), and/or public financial information. Often, however, some of this information will be unavailable or inaccessible to a law enforcement official. For example, even though law enforcement officials may be able to obtain an offender's name, phone number, and address, the offender may refuse to relinquish information related to the offender's online presence and social media accounts. Additionally, when an offender utilizes an online alias (such as a fake name, screen name, or handle), law enforcement agents will be unable to easily determine social media accounts belonging to the offender with basic information.

While social media monitoring system 110 begins by attempting to identify individuals using basic information, such as the offender's name, phone number, and address, social media monitoring system 110 also utilizes information stored in criminal history database 140 and offender communication device 120 to aid in identifying social media accounts.

For example, social media monitoring system 110 accesses criminal history database 140 to acquire information related to past crimes or recorded criminal associations and affiliations. Criminal history database 140 may be a jail management system, an offender management system, a jurisdictional crime database, a law enforcement database, a national criminal history database, such as, for example, the National Crime Information Center and/or the Interstate Identification Index, and/or a database storing criminal history records related to investigations, arrests, and/or convictions. For example, criminal history database 140 may store transcripts from previous interviews. In an embodiment, a third party may name the current offender in a previous interview.

By accessing criminal history database 140, social media monitoring system 110 is able to determine past information related to an offender or an inmate. For example, social media monitoring system 110 may identify past aliases used by an offender and utilize the past alias to identify social media accounts using an Internet search. Social media monitoring system 110 also utilizes information related to co-conspirators, affiliated gang members, or victim information to aid in identifying the social media accounts, such as via a "Friend" or "Follower" relationship on social media accounts.

Social media monitoring system 110 also utilizes information stored on an offender communication device 120 to aid in the determination of social media accounts. An offender communication device 120 may be a mobile phone and/or tablet belonging to an offender or inmate. An offender or inmate may be accessing the offender communication device 120 with or without authorization. In an embodiment, offender communication device 120 is an electronic mobile device owned by an offender who has not been incarcerated but is under investigation by law enforcement agents. To overcome potential Fourth Amendment issues, the offender may grant permission to the law enforcement agents to access an offender communication device 120 using social media monitoring system 110. In an embodiment, social media monitoring system 110 accesses contact lists and/or social media applications stored on an offender communication device 120. Accessing installed social media applications will provide explicit social media account information. Accessing names, phone numbers, addresses, or other information stored in contact lists will provide social media monitoring system 110 with relevant third party information. Social media monitoring system 110 can then utilize this third party contact information to identify social media accounts belonging to the third parties as well as identify offender social media accounts linked to or associated with the third party social media accounts. For example, by accessing a third party's social media account, social media monitoring system 110 may also recognize that a social media account belonging to the offender or inmate is listed on the third party's "friend" list.

Using information accessed from an offender communication device 120 and criminal history database 140 along with basic identification information received from the offender and/or inmate, social media monitoring system 110 conducts a search for social media accounts related to the offender or inmate. In an embodiment, social media monitoring system 110 utilizes an internet search engine, conducting one or more searches based on the information gathered. The search engine then yields various social media search results along with social media accounts and profiles stored on various social media databases 150. Social media databases 150 are databases belonging to one or more social media service providers that store information on behalf of social media users.

In an embodiment, instead of utilizing a search engine, social media monitoring system 110 directly communicates with one or more social media servers that grants access to social media databases 150 to retrieve account information. For example, social media monitoring system 110 utilizes a preset list of social media websites that are checked using the gathered offender information. Social media monitoring system 110 conducts one or more searches with the social media database which may include several combinations of keywords. In an embodiment, social media monitoring system compiles keywords and/or search terms into one or more packets delivered to social media servers interfaced with social media databases 150 to retrieve social media account information.

Social media monitoring system 110 searches for keyword associations as well as other identifying information associated with retrieved social media accounts to determine a confidence score. In an embodiment, social media monitoring system 110 assigns a confidence score to each retrieved social media accounts to highlight a confidence level of whether a retrieved social media account belongs to the offender or inmate. In an embodiment, social media monitoring system 110 also identifies third party social media accounts and assigns a relevance score to these accounts to identify potential criminal relevance, how closely related the third party is to the offender, and/or the frequency of interaction between the third party account and an offender account. Based on the confidence score and/or relevance score, social media monitoring system 110 may generate a graphical user interface with links to access the retrieved social media accounts. Embodiments of graphical user interfaces are described in further detail with reference to FIG. 3 and FIG. 4.

To determine a confidence score and/or a relevance score, social media monitoring system 110 increases or decreases a value based on factors increasing or decreasing confidence or relevance. In an embodiment, social media monitoring system 110 assigns weights to various parameters associated from a retrieved social media account. For example, if a name, phone number, and/or address stored on the social media account matches the offender, social media monitoring system 110 determines that the social media account has a high degree of confidence and relevance. Social media monitoring system 110 may increase the confidence score and/or relevance score based on the match.

Social media monitoring system 110 also increases the confidence score and/or relevance score based on images or videos depicting the offender or inmate associated with the social media account. Social media monitoring system 110 also identifies keywords in posts associated with the social media account. For example, some identified keywords relate to crimes that the offender and/or inmate is suspected of committing or has been convicted of committing. Other keywords include location information that may be corroborated based on past, ongoing, or future investigation conducted by law enforcement agents. For example, criminal history database 140 may include information obtained during an interview stating that an offender was present at a particular location at a specific date and time. If social media monitoring system 110 identifies a post indicating that the owner of a social media account "checked-in" at the location at the provided time, social media monitoring system 110 will mark the social media account as more relevant and increase the confidence score and/or relevance score.

In an embodiment, social media monitoring system 110 utilizes a list of predetermined keywords when conducting a search. For example, a law enforcement agent stores a list of common keywords, such as keywords related to criminal activity, in memory to be utilized by social media monitoring system 110 when conducting searches. In an embodiment, social media monitoring system 110 utilizes different keywords for different types of searches. For example, social media monitoring system 110 utilizes a first group of keywords when searching for offenders and utilizes a second group of keywords when searching for inmates. Similarly, social media monitoring system 110 may utilize different keywords depending on whether information related to the offender is found in criminal history database 140, the type of information stored in criminal history database 140, or the amount of information stored in criminal history database 140. For example, if little (e.g., below a threshold of information) to no information is found in criminal history database 140, social media monitoring system 110 utilizes more keywords or a longer list of predefined keywords. In an embodiment, if a criminal history record stored in criminal history database 140 indicates that the offender or inmate has been accused of committing a particular crime, social media monitoring system 110 utilizes keywords related to that crime when searching social media accounts.

In an embodiment, social media monitoring system 110 accepts user-inputted keywords when initially conducting a search. For example, a law enforcement official submits relevant keywords to social media monitoring system 110 when submitting offender or inmate information to social media monitoring system 110. Social media monitoring system 110 is also able to tailor the search based on the specific social media accounts retrieved.

In an embodiment, to identify keywords based on the search, social media monitoring system 110 analyzes text, images, and/or videos associated with retrieved social media accounts. For example, social media monitoring system 110 compares textual keywords with matching keywords from the social media accounts. The frequency of appearance of keywords increase the relevance score of a social media account. In an embodiment, social media monitoring system 110 also performs image comparisons between social media account images and images supplied by law enforcement officials or images stored on criminal history database 140. In an embodiment, social media monitoring system 110 utilizes line image and pixel comparison algorithms to identify relevant images and/or perform a comparison. In an embodiment, social media monitoring system 110 marks an image as relevant and increase the relevance score of a social media account if the number of differences detected between two images is below a threshold. In an embodiment, social media monitoring system 110 also utilizes facial recognition software in the comparison of images. In an embodiment, social media monitoring system 110 also utilizes text recognition algorithms to identify text from images and compares the text with identified keywords.

In an embodiment, the frequency of usage of a particular social media account affects the relevance score of the social media account. For example, if an offender, inmate, or third party is more active on an electronic forum rather than a personal web profile, the relevance score for the electronic forum will be greater than the relevance score of the personal web profile.

In an embodiment, social media monitoring system 110 also identifies known connections based on criminal history data from criminal history database 140. For example, if an offender is affiliated with a gang and criminal history database 140 includes gang member affiliations, social media monitoring system 110 is able to examine "friends" associated with the social media account. If the social media account is linked to other social media accounts belonging to known gang members and the offender is suspected of belonging to the gang, social media monitoring system 110 increases the confidence and/or relevance score of the social media account. Social media monitoring system 110 also examines information relevant to co-conspirators or other individuals involved in the suspected crime committed by an offender. If co-criminals are "friends" with or share posts with the social media account in question, social media monitoring system 110 increases the confidence and/or relevance score.

Similarly, social media monitoring system 110 identifies posts generated by or posted to the social media account in question. If posts generated by or posted to the social media account also link to gang affiliates, social media monitoring system 110 will increase the confidence score. In this manner, social media monitoring system 110 also considers communications generated by or received by the social media accounts to determine if the social media account belongs to the offender.

Other factors that social media monitoring system 110 considers include occupational or educational information that may be confirmed via past interviews with the offender, post content that coincides with a philosophical belief held by the offender (e.g., religion, political party, thoughts on race), texting/spelling patterns utilized (e.g., excessive or minimal capitalization, punctuation, or types of shorthand notation based on a comparison of text communication identified from an offender communication device 120), and/or usage of Internet memes. Social media monitoring system 110 also considers patterns between different identified social media accounts to concurrently raise or lower the confidence and/or relevance score.

In an embodiment, conflicting information reduces the confidence and/or relevance score. For example, if a name matches but a posting demonstrates conflicting information, social media monitoring system 110 lowers the confidence score. In this manner, social media monitoring system 110 is able to balance information confirming that a social media account belongs to an offender with information indicating that the social media account may not belong to the offender. Social media system 110 can also generate a spectrum of social media accounts with different confidence and/or relevance scores depending on varying degrees of confirmed and contradictory information.

Based on the balancing of this information along with detecting associations with known contacts or criminal history information, social media monitoring system 110 is able to identify and evaluate social media accounts even if the offender's name, phone number, or address is not associated with the account. Thus, social media system 110 is able to identify social media accounts created under an alias and/or username.

In addition to identifying offender and/or inmate social media accounts, according to some embodiments, social media monitoring system 110 is able to detect social media accounts belonging to relevant third parties associated with the offender or inmate. Identification of relevant third parties allows for potential monitoring and detection of past or future criminal activity. For example, with the rise in usage of social media, criminal enterprises may use social media to communicate. In some cases, a criminal leader, "shot caller," or co-conspirator may provide directions or guidance to associates of a criminal enterprise under the guise of social media. For example, the inmate in question may be the leader of a criminal organization and relevant third parties may belong to lower level offenders. By identifying and monitoring the social media presence of these relevant third parties via social media monitoring system 110, law enforcement agents will be able to prevent potential plans of inmate escape.

Similarly, if a non-incarcerated third party provides instructions to an incarcerated third party under a seemingly innocuous public website accessible by the inmate, social media monitoring system 110 will flag these communications based on the identification and monitoring of the non-incarcerated individual's social media account. Identifying these instructions may prevent crimes occurring in a jail or prison, such as, for example, an attack on another inmate or the smuggling of contraband into the prison.

To identify relevant third party social media accounts, social media monitoring system 110 uses information from an offender communication device 120 and criminal history database 140 to generate an association. Social media monitoring system 110 utilizes associations such as individuals in a contact list stored on the offender communication device 120 or known prior criminal associations recorded in criminal history database 140 to identify potential co-criminals. For example, the offender or inmate may have identified certain individuals in an attempt to provide an alibi in a previous investigation transcript stored on criminal history database 140.

Social media monitoring system 110 also identifies relevant third parties based on posts and/or connections with social media accounts belonging to offenders or inmates. For example, social media monitoring system 110 considers the number of posts a third party has submitted to the offender's social media account. Using this information, social media monitoring system 110 accesses potential third party social media accounts from social media databases 150 in ways similar to those utilized to access the offender or inmate account.

In addition to identifying social media accounts belonging to third parties, social media monitoring system 110 analyzes the identified accounts and generates corresponding confidence and relevance scores related to these third party accounts. Social media monitoring system 110 utilizes these scores to organize the presentation and monitoring of third party social media accounts. Confidence scores represent a degree to which a social media account belongs to an identified third party. Social media monitoring system 110 determines a confidence score in a manner similar to determining a confidence score for an offender or inmate. In an embodiment, social media monitoring system 110 analyzes textual patterns determined from communications found on an offender communication device 120 to determine the confidence of a third party social media account using the same textual patterns. Similarly, social media monitoring system 110 may compare images or videos identifying the individuals using facial recognition algorithms to determine a match. Using this information, social media monitoring system 110 is able to determine a confidence score related to each identified social media account.

Social media monitoring system 110 also determines a relevance score associated with each identified third party social media account. Social media monitoring system may determine the relevance score before, after, or simultaneously with the confidence score. Relevance scores in the third party social media account context represent how closely tied the third party social media accounts are to the offender or inmate social media accounts. Social media monitoring system 110 determines relevance scores for third party social media accounts in a manner similar to offender or inmate social media accounts. In an embodiment, social media monitoring system 110 also considers the frequency of communications exchanged between the accounts to determine the relevance score. The communications include, for example, messages, posts, comments, mentions, acknowledges such as "likes" or "reposts," and other types of interactions between the accounts. In an embodiment, a higher frequency leads to a higher relevance score.

Social media monitoring system 110 also examines the content of posts from the third party account to determine the relevance score. For example, social media monitoring system 110 reviews keywords related to the circumstances surrounding the crime allegedly committed by the offender or inmate. The third party social media account may include message, comment, or post information that indicates that the third party may have information relevant to the crime. For example, the third party may have witnessed the crime or provided instructions or guidance in committing the crime. Social media monitoring system 110 also detects location information as well as time information to determine the relevance score. Social media monitoring system 110 also examines words related to crimes generally to determine the relevance score. For example, social media monitoring system 110 detects words related to crimes, drugs, and/or firearms and notes the frequency with which the social media account uses these words.

Additionally, social media monitoring system 110 utilizes image recognition and/or facial recognition to identify images or videos of the third party with the offender or inmate. If a third party social media account includes many images depicting the offender with the third party, social media monitoring system 110 will increase the relevance score related to the social media account. When determining a confidence score, social media monitoring system 110 also performs facial recognition processing on images found on social media accounts and compares images with images received from offender communication device 120 or criminal history database 140. For example, social media monitoring system 110 compares a mug shot to social media images.

In an embodiment, social media monitoring system 110 maintains a web of associations between multiple offenders, inmates, and third parties based on identification of social media. For example, two inmates may share a mutual friend who is not incarcerated but relevant to both inmates. Social media monitoring system 110 identifies the mutual friend using the discussed techniques and stores an association with each of the two inmates. In an embodiment, social media monitoring system 110 exists as a cloud-based application and stores this association in a database. Based on the mutual friend, social media monitoring system 110 is also able to store an association between the inmates using the relevance scores even if the inmates are not directly connected via social media accounts.

Depending on hardware limitations or the desires of user utilizing social media monitoring system 110, social media monitoring system 110 can filter retrieved social media accounts related to offenders, inmates, or third parties based on commands generated by the users. For example, social media monitoring system 110 sets one or more thresholds for confidence score and relevance scores. If a retrieved social media account does not meet the confidence score and/or relevance score threshold, social media monitoring system 110 will not store an association or monitor the social media account for updates. Social media monitoring system 110 is also able to filter by parameters other than confidence score or relevance score. For example, social media monitoring system 110 can filter by factors utilized in determining confidence scores or relevance scores, such as, for example, name, phone number, address, frequency of posts, image comparisons, dates of activity, keywords, and/or other factors relevant to law enforcement officials.

Figure 3:
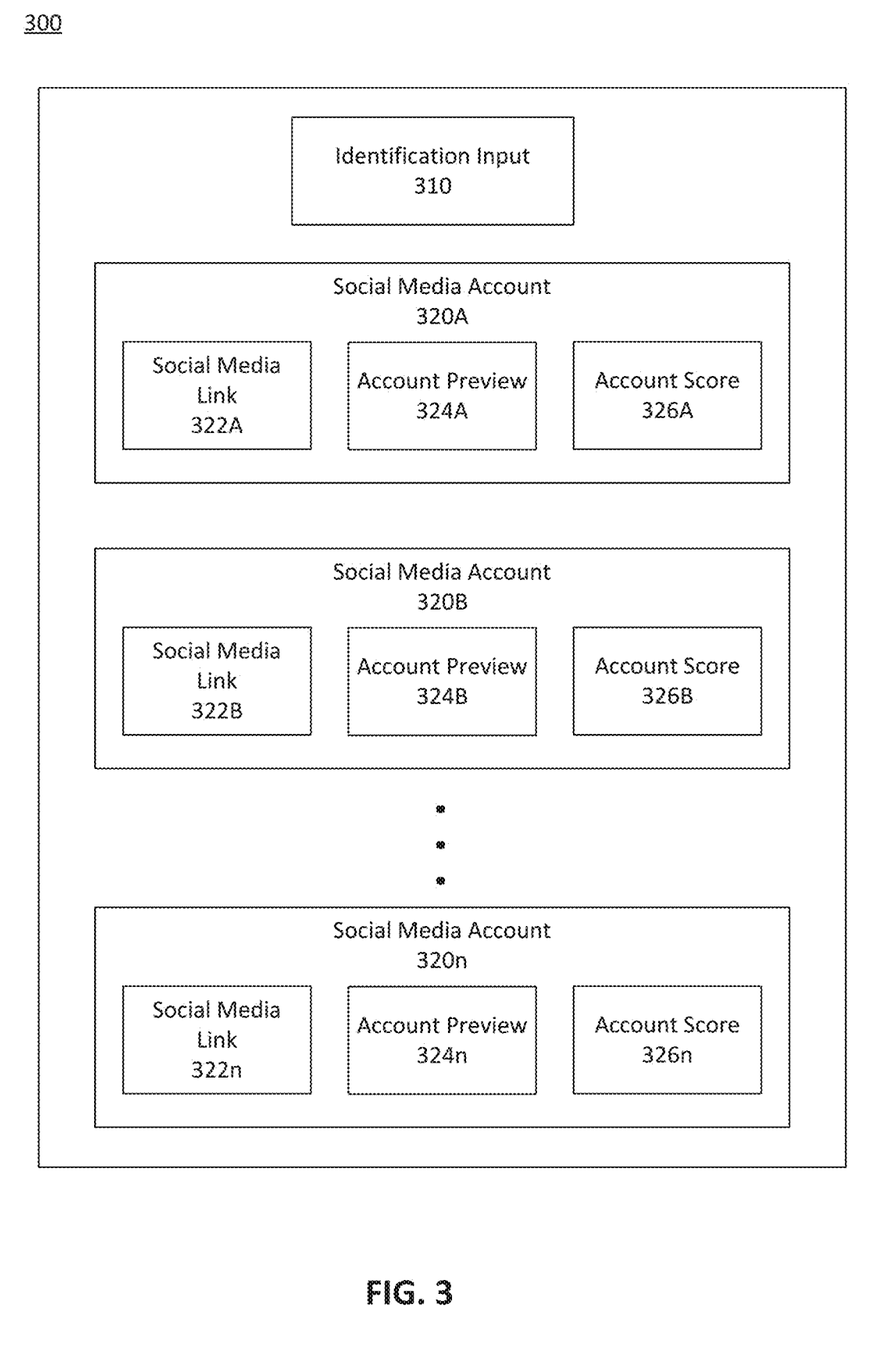
FIG. 3 illustrates a block diagram of a graphical user interface for identifying social media accounts, according to exemplary embodiments.
Figure 4:
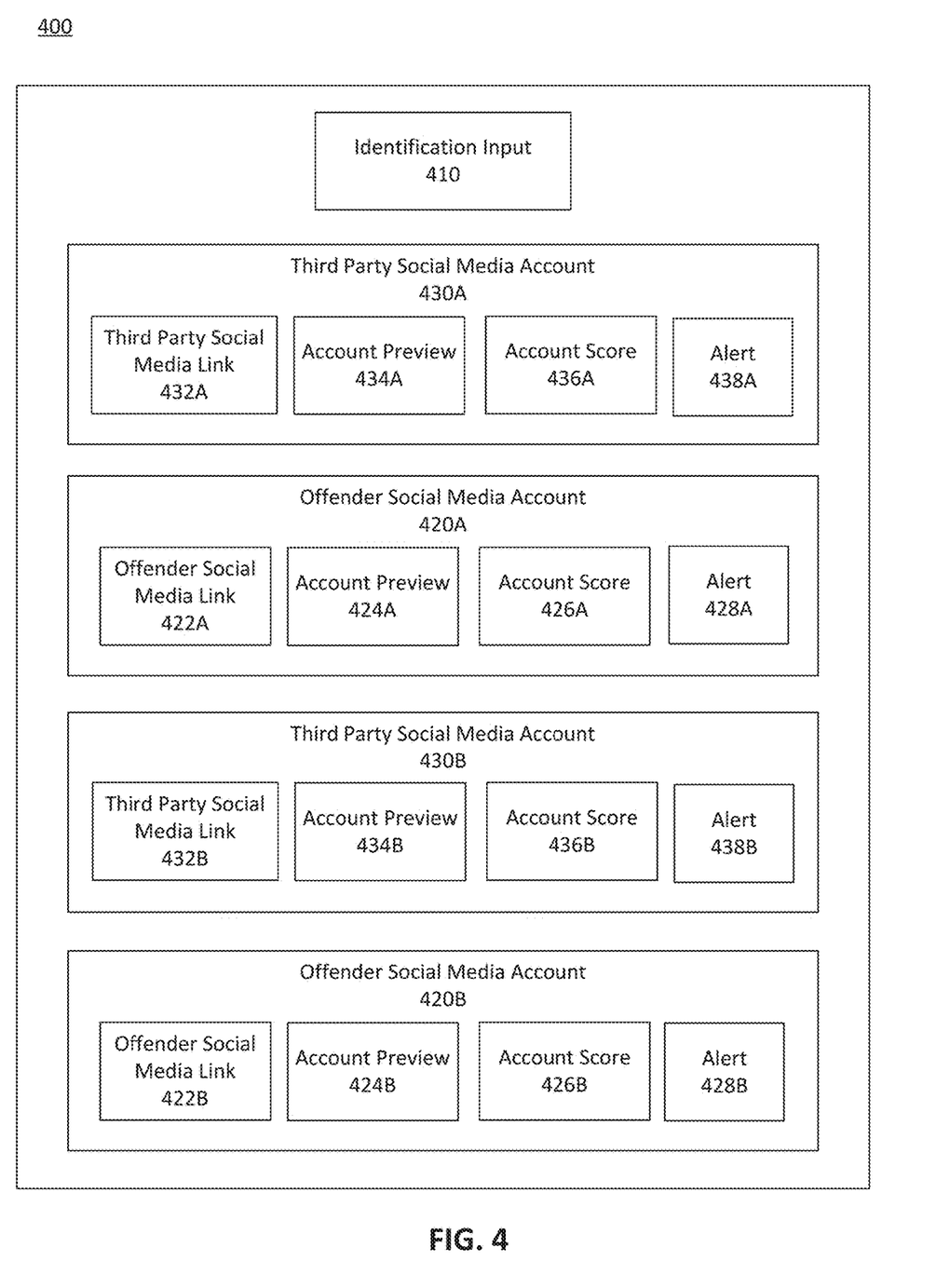
FIG. 4 illustrates a block diagram of a graphical user interface for monitoring social media accounts, according to exemplary embodiments.

Based on the retrieval of social media accounts related to offenders, inmates, and/or third parties, social media monitoring system 110 generates a graphical user interface that organizes and displays links to the social media accounts. In an embodiment, the links are displayed with a corresponding confidence score and/or relevance score. FIG. 3 depicts an example embodiment of a graphical user interface displaying retrieved social media accounts related to an offender or inmate. FIG. 4 depicts an example embodiment of a graphical user interface displaying retrieved social media accounts related to an offender, inmate, or third party. In an embodiment, social media monitoring system 110 is a cloud-based application capable of transmitting links or graphical user interfaces to electronic communication devices operated by law enforcement agents. In an embodiment, social media monitoring system 110 includes hardware capable of displaying and linking the social media accounts so that law enforcement agents can view, select, and access social media accounts.

Once social media accounts belonging to offenders, inmates, and/or third parties have been identified, social media monitoring system 110 monitors the identified social media accounts. Monitoring the accounts allows social media monitoring system 110 to detect suspicious activity or security threats. For example, social media monitoring system 110 detects communications potentially indicating a plot to perform a future crime. Social media monitoring system 110 also detects the use of contraband electronic devices by offender and/or inmates.

In an embodiment, to monitor the social media accounts, social media monitoring system 110 utilizes a change detection and notification algorithm based on the content of the social media accounts. This change detection and notification service may be server based (i.e., server polling to track changes and log data) or client based (i.e., a local client application polls content to track changes and log data). Social media monitoring system 110 may utilize cloud computing to monitor the social media accounts.

In an embodiment, social media monitoring system 110 reviews posts generated by identified social media accounts. In an embodiment, social media monitoring system 110 monitors social media accounts having a confidence and/or relevance score greater than the confidence and/or relevance score thresholds. Based on the posts, social media monitoring system 110 identifies keyword, images, audio, and/or video that may indicate the potential for a future crime. For example, posts may include keywords or images of crimes, drugs, or firearms. Based on a detection of these keywords, social media monitoring system 110 generates an alert to a law enforcement agent. In an embodiment, social media monitoring system 110 generates a push notification viewable on an electronic communication device utilized by the law enforcement agent. The law enforcement agent can then respond to the notification and determine whether further investigation is required.

Social media monitoring system 110 also detects the usage of contraband electronic communication devices by offenders or inmates. For example, based on detecting a change in content (such as a comment or post), social media monitoring system 110 is able to detect a location and/or time associated with the change in content. If an offender or inmate is incarcerated, however, the offender or inmate should not have access to an electronic communication device capable of posting to social media. Thus, if social media monitoring system 110 detects that an inmate social media account has posted, social media monitoring system 110 can detect that the inmate may be accessing a contraband electronic device. Social media monitoring system 110 can then alert correctional facility staff to investigate and seize the contraband electronic device.

Similarly, if a post associated with an inmate social media account is created while the inmate is incarcerated, social media monitoring system 110 will be able to detect if a third party is controlling the inmate's social media account. For example, social media monitoring system 110 can determine the location of the electronic communication device generating the post. If the device is located remote from the correctional facility, social media monitoring system 110 will log and flag the post and generate an alert to law enforcement agents to investigate. If a third party has assumed the identity of the inmate, the third party may attempt to use the identity to commit further crimes.

In this manner, social media monitoring system 110 is capable of monitoring social media accounts belonging to offenders, inmates, and third parties. While identifying accounts is important for an initial investigation performed by law enforcement officials, monitoring allows law enforcement officials to respond when a security threat has occurred without the need to manually monitor social media accounts. Social media monitoring system 110 saves law enforcement resources and targets relevant security and safety issues as they arise.

Figure 2:
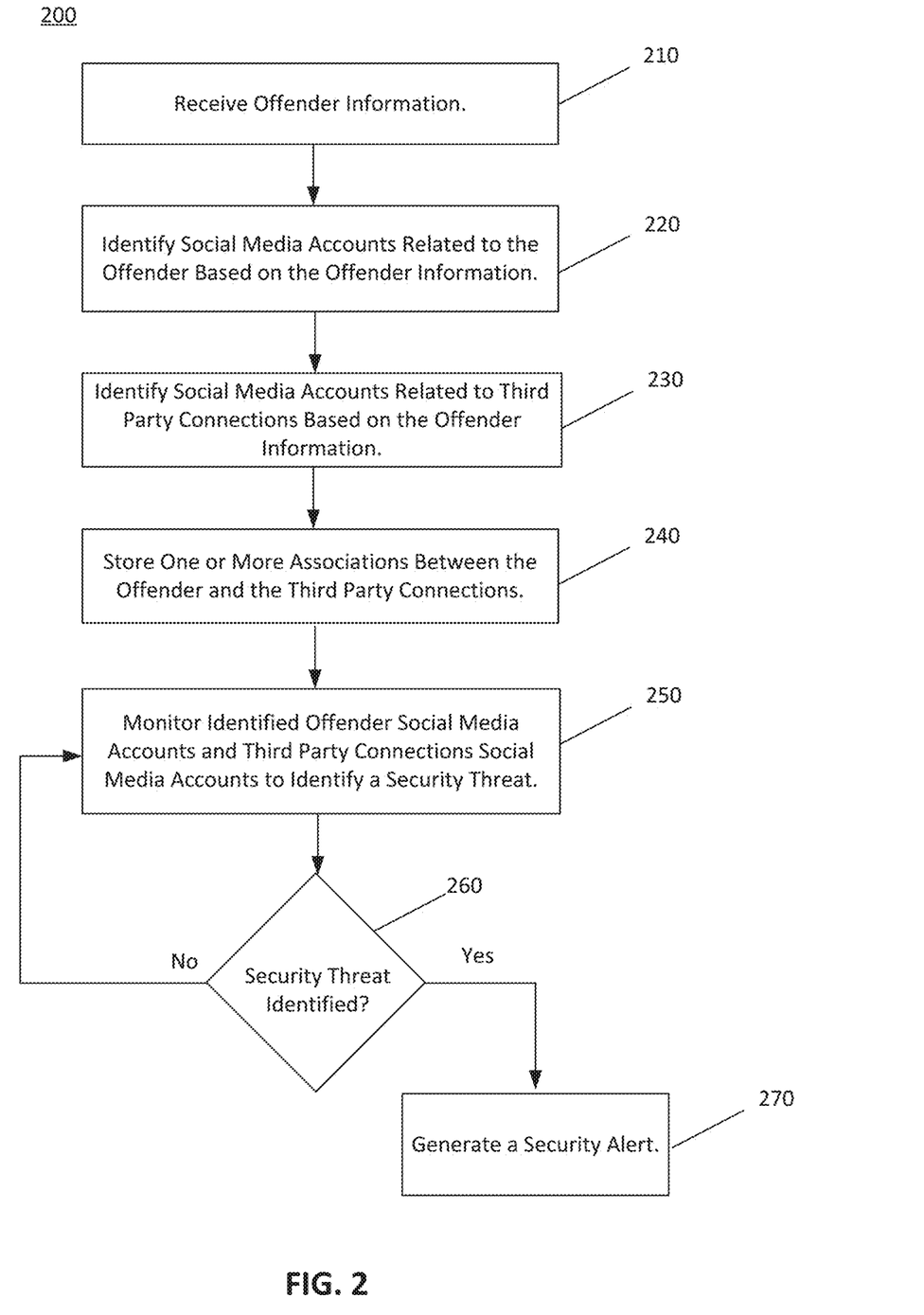
FIG. 2 illustrates a flowchart illustrating a method for identifying and monitoring social media accounts, according to exemplary embodiments.

FIG. 2 illustrates a flowchart illustrating a method 200 for identifying and monitoring social media accounts, according to exemplary embodiments. Method 200 shall be described with reference to FIG. 1; however, method 200 is not limited to that example embodiment.

In an embodiment, social media monitoring system 110 utilizes method 200 to identify and/or monitor social media accounts related to offenders, inmates, and/or third parties. The foregoing description will describe an embodiment of the execution of method 200 with respect to social media monitoring system 110. While method 200 is described with reference to social media monitoring system 110, method 200 may be executed on any computing device, such as, for example, the computer system described with reference to FIG. 5 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

In an embodiment, at 210, social media monitoring system 110 receives offender information. Offender information includes information available to law enforcement officials related to an offender or inmate. For example, offender information includes a name, phone number, address, electronic contact information (such as email address, social media handle, video game handle, message board handle, or electronic forum handle), and/or public financial information. Law enforcement officials may submit the offender information directly to social media monitoring system 110 via hardware peripheral attached to social media monitoring system 110. In an embodiment, social media monitoring system 110 may operate on a server and law enforcement officials may transmit the information electronically and/or wirelessly from an electronic communication device, such as a phone, tablet, desktop computer, or laptop computer.

Based on the received offender information, at 220, social media monitoring system 110 identifies social media accounts related to the offender. Social media monitoring system identifies social media accounts related to the offender in a manner similar to that described with reference to FIG. 1. Social media monitoring system 110 accesses criminal history database 140 and/or information stored on an offender communication device 120 to provide a basis for communicating with a social media database 150. Social media monitoring system 110 queries one or more social media databases using this information and retrieves an initial set of social media account results.

Social media monitoring system 110 then determines a confidence and/or relevance score associated with each of the retrieved social media accounts. Law enforcement officials may dictate the parameters to be utilized or weighted to determine these scores. Social media monitoring system 110 may also filter out specific social media accounts and set confidence scores to zero if information on the social media account contradicts information provided during an interview or independently verified by information in criminal history database 140. In an embodiment, based on these scores and the weighing of confirmed information to contradictory information, social media monitoring system 110 filters out social media accounts that do not have confidence scores or relevance scores that meet a specified threshold. In an embodiment, social media monitoring system 110 displays to law enforcement agents social media accounts that meet the thresholds. In an embodiment, social media monitoring system 110 includes a screen that displays a graphical user interface with a link to the social media account. In an embodiment, social media monitoring system 110 transmits the link as well as a confidence and/or relevance score to a separate electronic communication device accessible by a law enforcement official. This transmission may occur via an application installed on the electronic communication device that is capable of communicating with the social media monitoring system 110.

At 230, social media monitoring system 110 identifies social media accounts related to third party connections based on the offender information. As described with reference to FIG. 1, third parties affiliated with offenders or inmates may maintain social media accounts that may provide information relevant to the suspected crime charged against the offender or inmate or may provide information about a potential future crime or security threat. In a manner similar to identifying a social media account belonging to an offender or inmate, social media monitoring system 110 identifies relevant third parties using information accessed from contact lists or social media applications stored on offender communication devices 120 as well as criminal history databases 140.

Social media monitoring system 110 also determines a confidence score and a relevance score associated with the identified social media accounts related to third party connections. The confidence score represents a measure of how likely the identified social media account belongs to the third party. The relevance score represents a measure of how closely associated the identified third party social media account is with the identified offender or inmate social media accounts. As explained with reference to FIG. 1, the relevance score may factor information such as the number or frequency of communications between the identified offender or inmate social media accounts and the third party social media accounts. In an embodiment, even if an offender communication device 120 and a criminal history database 140 do not yield useful information for determining a social media account related to a third party, by analyzing the communications and associations of the offender's or inmate's social media accounts, social media monitoring system 110 will be able to identify third parties along with a relevance score based on the type and frequency of interactions.

At 240, social media monitoring system 110 evaluates the identified social media accounts related to the offender or inmate as well as the identified social media accounts related to third parties and stores one or more associations between the offender and the third party connections. In an embodiment, social media monitoring system 110 stores associations for monitoring social media accounts. Because hardware or monetary resources may be limited, social media monitoring system 110 selectively determines the social media accounts to monitor. In an embodiment, social media monitoring system 110 determines the particular of social media accounts to monitor based on a confidence score and/or a relevance score associated with the social media account. For example, social media monitoring system 110 sets a confidence threshold and/or a relevance threshold that a particular social media account must meet before social media monitoring system 110 will monitor the social media account. In an embodiment, social media monitoring system 110 stores associations for social media accounts that meet one or both thresholds. Social media monitoring system 110 stores these associations in a database or memory.

At 250, social media monitoring system 110 monitors identified offender or inmate social media accounts and third party connections social media accounts to identify a security threat. In an embodiment, social media monitoring system 110 utilizes a change detection and notification algorithm to monitor the content associated with the social media accounts. This change detection and notification service may be server based (i.e., server polling to track changes and log data) or client based (i.e., a local client application polls content to track changes and log data). Social media monitoring system 110 may utilize cloud computing to monitor the social media accounts.

In an embodiment, social media monitoring system 110 reviews posts generated by identified social media accounts. In an embodiment, social media monitoring system 110 monitors social media accounts having a confidence and/or relevance score greater than the confidence and/or relevance score thresholds. Based on the posts, at 250, social media monitoring system 110 identifies keyword, images, audio, and/or video that may indicate the potential for a security threat or future crime. For example, posts may include keywords or images of crimes, drugs, or firearms. Based on a detection of these keywords, social media monitoring system 110 identifies and/or records a security threat at 260. Social media monitoring system 110 may identify security threats based also on the frequency of communications containing targeted keywords.

At 260, social media monitoring system 110 also detects the usage of contraband electronic communication devices by offenders or inmates as a security threat. For example, based on detecting a change in content (such as a comment or post), social media monitoring system 110 is able to detect a location and/or time associated with the change in content. If an offender or inmate is incarcerated, however, the offender or inmate should not have access to an electronic communication device capable of posting to social media. Thus, if social media monitoring system 110 detects that an inmate social media account has posted, social media monitoring system 110 can detect that the inmate may be accessing a contraband electronic device at 260. Social media monitoring system 110 can then alert correctional facility staff at 270 to investigate and seize the contraband electronic device.

Similarly, if a post associated with an inmate social media account is created while the inmate is incarcerated, social media monitoring system 110 will be able to detect if a third party is controlling the inmate's social media account at 260. For example, social media monitoring system 110 can determine the location of the electronic communication device generating the post. If the device is located remote from the correctional facility, social media monitoring system 110 will log and flag the post and generate an alert to law enforcement agents to investigate. If a third party has assumed the identity of the inmate, the third party may attempt to use the identity to commit further crimes.

Social media monitoring system 110 also detects the usage of contraband electronic communication devices by offenders or inmates. For example, based on detecting a change in content (such as a comment or post), social media monitoring system 110 is able to detect a location and/or time associated with the change in content. If an offender or inmate is incarcerated, however, the offender or inmate should not have access to an electronic communication device capable of posting to social media. Thus, if social media monitoring system 110 detects that an inmate social media account has posted, social media monitoring system 110 can detect that the inmate may be accessing a contraband electronic device. Social media monitoring system 110 can then alert correctional facility staff to investigate and seize the contraband electronic device.

Similarly, if a post associated with an inmate social media account is created while the inmate is incarcerated, social media monitoring system 110 will be able to detect if a third party is controlling the inmate's social media account. For example, social media monitoring system 110 can determine the location of the electronic communication device generating the post. If the device is located remotely from the correctional facility, social media monitoring system 110 will log and flag the post and generate an alert at 270 to law enforcement agents to investigate. If a third party has assumed the identity of the inmate, the third party may attempt to use the identity to commit further crimes.

If social media monitoring system 110 detects a security threat at 260 based on monitoring performed at 250, social media monitoring system 110 generates an alert to a law enforcement agent at 270. In an embodiment, social media monitoring system 110 generates a push notification viewable on an electronic communication device utilized by the law enforcement agent. If social media monitoring system 110 includes a display, social media monitoring system 110 generates an alert on the display. Law enforcement officials can then respond to the notification and determine whether further investigation is required. Social media monitoring system 110 also catalogues alerts generated as well as the specific posts or communications generating the alert. Social media monitoring system 110 also notifies correctional facility staff to investigate incarcerated offenders and inmates.

At 250 and 260, if monitored social media accounts do not yield any security threats, social media monitoring system 110 continues to monitor the identified accounts until a security threat is identified. In an embodiment, social media monitoring system 110 continues monitoring by polling social media databases 150 at periodic intervals for new information. In an embodiment, social media monitoring system 110 passively monitors social media databases 150 and generates an alert based on information received from social media servers connected to the social media databases 150. For example, social media databases 150 may generate a notification when new content, posts, or communications are generated by monitored social media accounts. The social media servers then send these notifications to social media monitoring system 110 in real-time as soon as a change in content is determined. Social media monitoring system 110 is then able to analyze the change in content to determine whether the communication, post, or message represents a security threat.

FIG. 3 illustrates a block diagram of graphical user interface (GUI) 300 for identifying social media accounts, according to exemplary embodiments. In an embodiment, GUI 300 allows a user or law enforcement official to view offender, inmate, or third party social media accounts 320 identified by social media monitoring system 110. Social media monitoring system 110 may display GUI 300 on a display screen and/or social media monitoring system 110 may transmit information to a remote electronic communication device to display GUI 300. GUI 300 displays results filtered by social media monitoring system 110. For example, GUI 300 displays the number of social media accounts 320 with confidence scores greater than a specified threshold. In an embodiment, GUI 300 organizes the displayed social media accounts 320 with the highest confidence or relevance score near the top and the lower confidence or relevance scores near the bottom. GUI 300 allows users to browse social media accounts and review the accounts without searching and attempting to local social media accounts via an Internet browser. GUI 300 provides a repository to access and preview social media accounts.

GUI 300 includes an identification input 310 and one or more social media accounts 320. In an embodiment, social media accounts 320 may all relate to a specific offender or inmate such that GUI 300 displays social media accounts belonging to a specific individual. Identification input 310 is a portion of GUI 300 that accepts user inputs and displays the search being conducted. For example, a user may input an offender or inmate name, phone number, address, or other identifying information to identification input 310. Identification input 310 provides a medium for a user to submit information to social media monitoring system 110 so that social media monitoring system 110 can retrieve relevant social media accounts. Identification input 310 is also capable of receiving information related to third parties allowing social media monitoring system 110 to also search for social media accounts relevant to third parties. In an embodiment, GUI 300 displays an on-screen keyboard allowing a user to input information. In an embodiment, identification input 310 allows a user to input parameters to filter results as well as threshold regarding confidence or relevance.

After receiving offender, inmate, or third party information via identification input 310, social media monitoring system 110 analyzes the provided information and retrieves social media accounts 320 corresponding to the individual sought to be investigated. In an embodiment, social media monitoring system 110 retrieves the social media accounts 320 that include a confidence or relevance score greater than a specified threshold. The retrieved social media accounts 320 will then be organized and displayed on GUI 300.

Social media accounts 320 include an social media link 322, an account preview 324, and an account score 326. The social media link 322 is a link such as a Uniform Resource Locator (URL) that allows a user to access the social media account 320. In an embodiment, interacting with a social media link 322 via a click or tap on GUI 300 fills GUI 300 with the social media website displaying the account. In an embodiment, selecting the offender social media link 322 covers a portion of GUI 300 with the access social media account and/or opens a new display pane to a side of GUI 300.

Each retrieved social media account 320 also includes an account preview 324. Account preview 324 indicates the social media website and/or application hosting the social media account profile. Account preview 324 also displays information from the social media account to generate a preview for the user such that the user need not review every social media link 322 by accessing each account individually. In an embodiment, GUI 300 sizes account previews 324 according to the size and/or screen ratio of a display screen displaying GUI 300.

Account preview 324 also displays information such as profile information, recent posts, images, and/or other portions of the social media account 320. In an embodiment, account preview 324 scrolls through portions of an offender social media account 320 to display different portions of offender social media accounts 320 based on information from a social media database 150. Using various account previews 324, a user is able to quickly browse various offender social media accounts 320 to view webpage and application data from within GUI 300 without the need to individually access each social media link 322.

Social media accounts 320 displayed on GUI 300 also include an account score 326. Account score 326 includes a confidence score, relevance score, and/or a combination of confidence score and relevance score. In an embodiment, the combination of confidence score and relevance score is a weighted average of the scores based on parameters set by an administrator of social media monitoring system 110. As discussed with reference to FIG. 1 and FIG. 2, a confidence score is a value indicative of whether a particular social media account belongs to searched individual. Social media monitoring system 110 determines a confidence score based on social media account information that matches and/or contradicts information gathered from an offender communication device 120 and/or criminal history database 140. In an embodiment, when viewing social media accounts related to a single individual, a relevance score is a value indicative of the frequency of usage of a particular social media account and/or the frequency of key posts or images targeted to criminal activity.

In an embodiment, GUI 300 organizes social media accounts 320 based on account score 326. For example, if account score 326 represents a confidence score, GUI 300 displays higher valued accounts scores 326 above lower valued account scores 326. GUI 300 will display social media account 320A above social media account 320B because account score 326A is greater than account score 326B. Displaying social media accounts 320 using this organization allows a user to view the most confident and/or most relevant social media accounts 320 based on analysis performed by social media monitoring system 110.

FIG. 4 illustrates a block diagram of graphical user interface (GUI) 400 for monitoring social media accounts, according to exemplary embodiments. In an embodiment, GUI 400 allows a user or law enforcement official to view offender, inmate, or third party social media accounts 420 identified by social media monitoring system 110. Social media monitoring system 110 may display GUI 400 on a display screen and/or social media monitoring system 110 may transmit information to a remote electronic communication device to display GUI 400. GUI 400 displays results filtered by social media monitoring system 110. GUI 400 also displays alerts 428 and 438 representative of when social media monitoring system 110 detects a security threat. Alerts 428 and 429 notify user and/or law enforcement officials that social media monitoring system 110 has detected a security threat. Using GUI 400, users and law enforcement officials are able to browse social media accounts where a security threat has been detected and review the accounts without needing to individually access different social media accounts via an Internet browser. GUI 400 provides a repository to access and preview social media accounts belonging to offenders, inmates, and third parties.

In an embodiment, GUI 400 includes an identification input 410, one or more offender social media accounts 420, and one or more third party social media accounts 430. Identification input 410 is a portion of GUI 400 that accepts user inputs and displays the search being conducted. For example, a user may input an offender or inmate name, phone number, address, or other identifying information to identification input 410. In an embodiment, a user may input identity information related to multiple individuals at identification input 410. Identification input 410 provides a medium for a user to submit information to social media monitoring system 110 so that social media monitoring system 110 can retrieve and monitor relevant social media accounts. Identification input 410 is also capable of receiving information related to third parties allowing social media monitoring system 110 to also search for social media accounts relevant to third parties. In an embodiment, GUI 400 displays an on-screen keyboard allowing a user to input information. In an embodiment, identification input 410 allows a user to input parameters to filter results as well as threshold regarding confidence or relevance.

After receiving offender, inmate, or third party information via identification input 410, social media monitoring system 110 analyzes the provided information and retrieves social media accounts 420 and 430 corresponding to the individual sought to be investigated. Offender social media accounts 420 include third party social media links 422, accounts previews 424, accounts scores, 426, and alerts 428. Third party social media accounts 430 include third party social media links 432, accounts previews 434, accounts scores, 436, and alerts 438.

Third party social media links 432 and offender social media links 422 operate in a similar manner to social media links 322 described with reference to FIG. 3. Selecting third party social media links 432 and offender social media links 422 allow a user to access the social media account profiles associated with the links.

Account previews 424 and 434 operate in a similar manner to account previews 324 described with reference to FIG. 3. Account previews 424 and 434 allow a user to preview content from an offender social media account 420 or a third party social media account 430 respectively. In an embodiment, if social media monitoring system 110 detects a security threat and generates an alert 428 or 438, the account preview 424 or 434 corresponding to the social media account associated with the security threat displays the social media content (e.g., a post, message, image, video, and/or other social media profile update) corresponding to the generated security threat. Using the account preview 424 or 434 allows a user or law enforcement official to quickly locate the relevant security threat information.

Account scores 426 and 436 operate in a similar manner to account scores 326 described with reference to FIG. 3. Account scores 436 and 436 may include a confidence score, relevance score, and/or a combination of confidence score and relevance score. In an embodiment, account scores 426 and 436 utilize a uniform scale so that social media monitoring system 110 is able to third party social media accounts 430 with offender or inmate social media accounts 420. In an embodiment, GUI 400 begins with an initial organization of social media accounts 420 and 430 based on highest account score 426 or 436 to lowest account score 426 or 436. Based on this organization, a third party social media account 430 may be displayed above an offender social media account 420 if the associated account score 436 is higher than the offender social media account score 426. For example, if a particular offender posts many communications to third party social media account 430A compared to his or her own offender social media account 420A, social media monitoring system 110 will recognize the higher frequency of posts and generate a higher relevance score and account score 436A for third party social media account 430A.

While GUI 400 may generate an initial organization of social media accounts 420 and 430 based on account scores 426 and 436, if social media monitoring system 110 detects a security threat, social media monitoring system 110 will generate an alert 428 or 438 and change the order of the social media accounts 420 and 430 displayed on GUI 400. For example, if social media monitoring system 110 detects a security threat associated with offender social media account 420B, social media monitoring system 110 will generate alert 428B and display offender social media account 420B first (i.e., above third party social media account 430A). In this manner, a user or law enforcement official is able to quickly view the alert 428B and security threat without the need to scroll or search for the specific social media account 420 or 430 among the other monitored social media accounts 420 or 430.

When social media monitoring system 110 generates an alert 428 or 438, GUI 400 displays a visual indicator at alert 428 or 438 indicating that content associated with offender social media account 420 or third party social media account 430 has been identified as a security threat. Social media monitoring system 110 may identify a security threat upon initialization of GUI 400, when social media monitoring system 110 receives information via identification input 410, or during the course of monitoring inmate and offender social media accounts 420 or third party social media accounts 430. In an embodiment, when an alert 428 or 438 is generated, GUI 400 displays a distinct color or symbol, such as, for example, a red exclamation mark, to identify the particular social media account 420 or 430 with a security threat. In an embodiment, when an alert 428 or 438 is generated, a link 432 or 422 and/or an account preview 424 or 434 is also sent with the alert 428 or 438. In an embodiment, social media monitoring system 110 may generate a push notification and/or cause a vibration to occur at an electronic device operated by a law enforcement official to view GUI 400. The generation of this alert allows law enforcement officials to be notified of security threats while social media monitoring system 110 performs the process of identifying and monitoring relevant social media accounts related to an offender, inmate, or third party.

Figure 5:
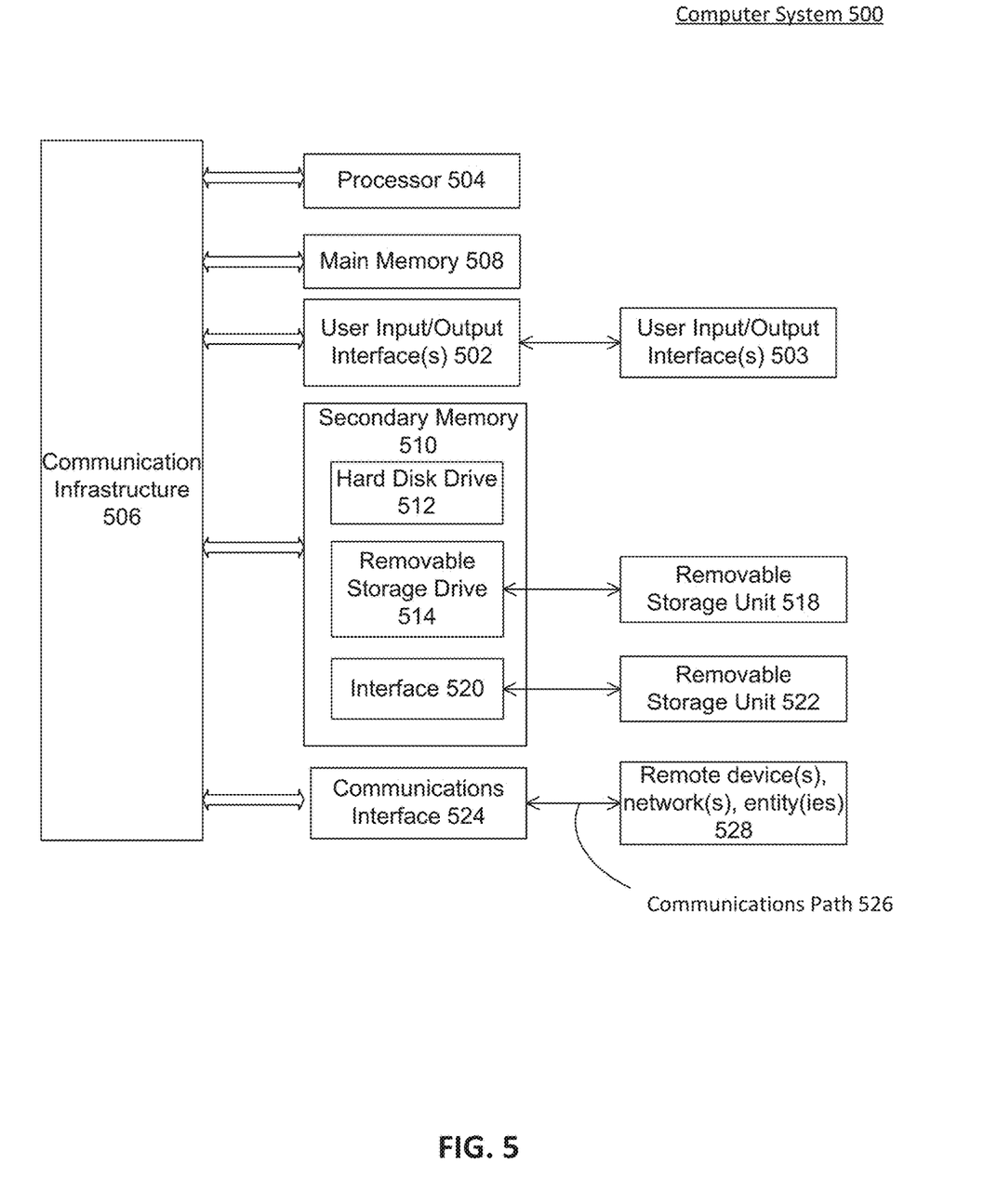
FIG. 5 illustrates an example computer system useful for implementing various embodiments.

Referring now to FIG. 5, various embodiments may be implemented, for example, using one or more computer systems, such as computer system 500 shown in FIG. 5. One or more computer systems 500 (or portions thereof) can be used, for example, to implement method 200 of FIG. 2.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 406 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communication path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 5. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A social media monitoring system, comprising:
   a memory; and
   one or more processors and/or circuits coupled to the memory, wherein the one or more processors and/or circuits are configured to:
   receive identification data related to an individual accused of committing a crime;
   search a criminal history record database using the identification data for a criminal history record related to the individual;
   generate a search packet including the criminal history record and the identification data;
   transmit the search packet to a first social media server and a second social media server different from the first social media server to receive a first social media account associated with the individual from the first social media server and a second social media account associated with the individual from the second social media server;
   identify a third social media account corresponding to another individual;
   determine a first account score for the first social media account, wherein the first account score is indicative of an amount of information associated with the first social media account confirmed by the identification data and the criminal history record and a first frequency of user activity corresponding to the first social media account;
   determine a second account score for the second social media account, wherein the second account score is indicative of an amount of information associated with the second social media account confirmed by the identification data and the criminal history record and a second frequency of user activity corresponding to the second social media account; and
   determine a third account score based on a frequency of interaction measured between the first social media account and the third social media account;
   generate a graphical user interface displaying the first social media account with a first account preview displaying information from the first social media account, the second social media account with a second account preview displaying information from the second social media account, and the third social media account with a third account preview displaying information from the third social media account, wherein the first account preview, the second account preview, and the third account preview are displayed in a list of social media accounts ranked by account score based on the first frequency of user activity, the second frequency of user activity, and the frequency of interaction.

2. The social media monitoring system of claim 1, wherein the criminal history record includes information related to a party other than the individual.

3. The social media monitoring system of claim 1, wherein the one or more processors and/or circuits are further configured to:
  identify the third social media account associated with a party other than the individual based on the first or second social media account associated with the individual.

4. The social media monitoring system of claim 1, wherein the one or more processors and/or circuits are further configured to:
  retrieve second identification data from a mobile electronic communication device, and wherein the search packet includes the second identification data.

5. The social media monitoring system of claim 1, wherein to determine the first account score of the first social media account, the one or more processors and/or circuits are further configured to:
  increase a numerical value based on a number of information matches detected between the identification data and account data of the first social media account;
  increase a numerical value based on a number of information matches detected between the criminal history record and the account data of the first social media account;
  decrease the numerical value based on a number of information mismatches detected between the identification data and the account data of the first social media account; and
  decrease the numerical value based on a number of information mismatches detected between the criminal history record and the account data of the first social media account.

6. The social media monitoring system of claim 1, wherein to determine the first account score of the first social media account, the one or more processors and/or circuits are further configured to:
  compare image data included in the identification data with image data associated with the first social media account.

7. The social media monitoring system of claim 1, wherein to determine the first account score of the first social media account, the one or more processors and/or circuits are further configured to:
  compare texting patterns utilized in the identification data with texting patterns associated with the first social media account.

8. The social media monitoring system of claim 1, wherein to generate the graphical user interface, the one or more processors and/or circuits are further configured to:
  compare the first account score to a predetermined account score threshold; and
  include the first social media account in the graphical user interface in response to determining that the first account score is greater than the predetermined account score threshold.

9. A social media monitoring system, comprising:
  a memory storing a ranked list of social media accounts belonging to an inmate and a non-incarcerated third party, wherein the ranked list of social media accounts includes a first social media account and a second social media account belonging to the inmate and a third social media account belonging to a third party individual and wherein the ranked list of social media accounts is ranked by account score based on a frequency of inmate interaction with the first social media account, the second social media account, and the third social media account; and
  one or more processors and/or circuits communicatively coupled to the memory and configured to:
    generate a graphical user interface displaying the ranked list of social media accounts, wherein the ranked list of social media accounts includes a first account preview displaying information from the first social media account, a second account preview displaying information from the second social media account, and a third account preview displaying information from the third social media account;
    monitor updates to social media accounts from the ranked list of social media accounts;
    analyze the updates to determine a presence of predetermined keywords related to criminal activity; and
    in response to detecting a predetermined keyword, display an alert on the graphical user interface displaying the ranked list of social media accounts.

10. The social media monitoring system of claim 9, wherein the predetermined keywords include a time associated with an update to the first social media account.

11. The social media monitoring system of claim 9, wherein the predetermined keywords include a location associated with an update to the first social media account.

12. The social media monitoring system of claim 9, wherein the alert includes a preview of the updates including the predetermined keyword.

13. The social media monitoring system of claim 9, wherein detecting the predetermined keyword occurs at the first social media account and the alert includes a link to the first social media account including the predetermined keyword.

14. The social media monitoring system of claim 9, wherein the one or more processors and/or circuits are further configured to:
  analyze the updates to determine a presence of images related to criminal activity; and
  in response to detecting the presence of images related to criminal activity, transmit an alert to an application accessible by law enforcement officials.

15. The social media monitoring system of claim 9, wherein the updates include postings to public Internet message boards.

16. A computer-implemented method, comprising:
  receiving identification data related to an individual accused of committing a crime;
  determining a first social media account belonging to the individual based on the identification data;
  determining a first account score associated with the first social media account based on a first frequency of user activity on the first social media account;
  determining a second social media account from a second social media service belonging to the individual based on the identification data;
  determining a second account score associated with the second social media account based on a second frequency of user activity on the second social media account;
  searching a criminal history database using the identification data to identify a second party associated with the individual;
  based on the searching, determining a third social media account belonging to the second party;
  determining a third account score associated with the third social media account based on a frequency of interaction measured between the first social media account and the third social media account; and generating a graphical user interface displaying a first account preview displaying information from the first social media account, a second account preview displaying information from the second social media account, and a third account preview displaying information from the third social media account in a list of social media accounts ranked by account score based on the first frequency of user activity, the second frequency of user activity, and the frequency of interaction measured between the first social media account and the third social media account.

17. The computer-implemented method of claim 16, wherein determining the third account score further comprises:
   increasing a numerical value in response to detecting an interaction between the first social media account and the third social media account.

18. The computer-implemented method of claim 17, wherein the interaction is detected on the third social media account.

19. The computer-implemented method of claim 16, wherein the individual and the second party are inmates.

20. The computer-implemented method of claim 16, further comprising:
   based on the searching, determining a fourth social media account belonging to the second party; and
   generating a fourth account score associated with the third social media account based on the frequency of interaction measured between the first social media account and the third social media account.

21. The computer-implemented method of claim 16, further comprising:
   searching a communication device belonging to the individual to identify a third party associated with the individual; and
   determining a fourth social media account belonging to the third party.

22. The computer-implemented method of claim 21, further comprising:
   generating a fourth account score associated with the fourth social media account based on the frequency of interaction measured between the first social media account and the fourth social media account.

* * * * *